United States Patent [19]

Leining

[11] Patent Number: 4,653,150
[45] Date of Patent: Mar. 31, 1987

[54] CARCASS SPLITTING APPARATUS

[75] Inventor: Lyndon R. Leining, Austin, Minn.

[73] Assignee: Geo. A. Hormel & Co., Austin, Minn.

[21] Appl. No.: 866,925

[22] Filed: May 27, 1986

[51] Int. Cl.$^4$ .............................................. A22B 5/20
[52] U.S. Cl. ...................................................... 17/23
[58] Field of Search ........................................... 17/23

[56] References Cited

U.S. PATENT DOCUMENTS 3,916,482  11/1975  Kvilhaug ................................ 17/23
4,562,614   1/1986  Gerding ................................. 17/23

Primary Examiner—Willie G. Abercrombie
Attorney, Agent, or Firm—Herman H. Bains

[57] ABSTRACT

An apparatus for splitting animal carcasses being conveyed by an overhead conveyor, which includes a tracking carriage engaging the carcass to be split, and being shiftable in the direction of movement of the carcass. A lateral feed carriage is mounted on the tracking carriage for movement relative thereto towards and away from the carcass to be split. A positioning plate assembly is mounted on the tracking carriage. A carcass engaging assembly is mounted on the lateral feed carriage and clamps the carcass to be split against the positioning plate assembly. A saw carrier is vertically mounted on the lateral feed carriage and is vertically shiftable relative thereto. The saw carriage is operable, when shifted vertically downwardly, to cut longitudinally through the length of the backbone of the carcass.

16 Claims, 8 Drawing Figures

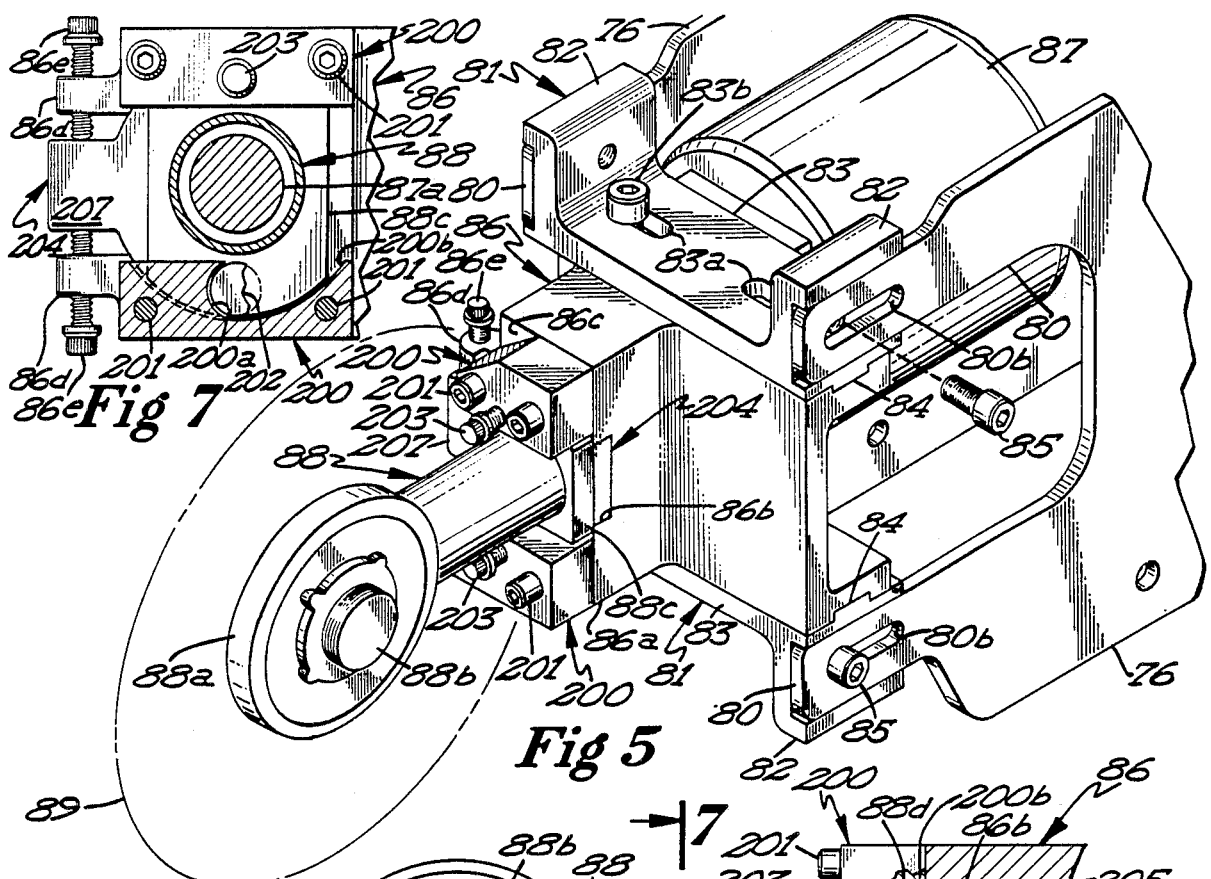
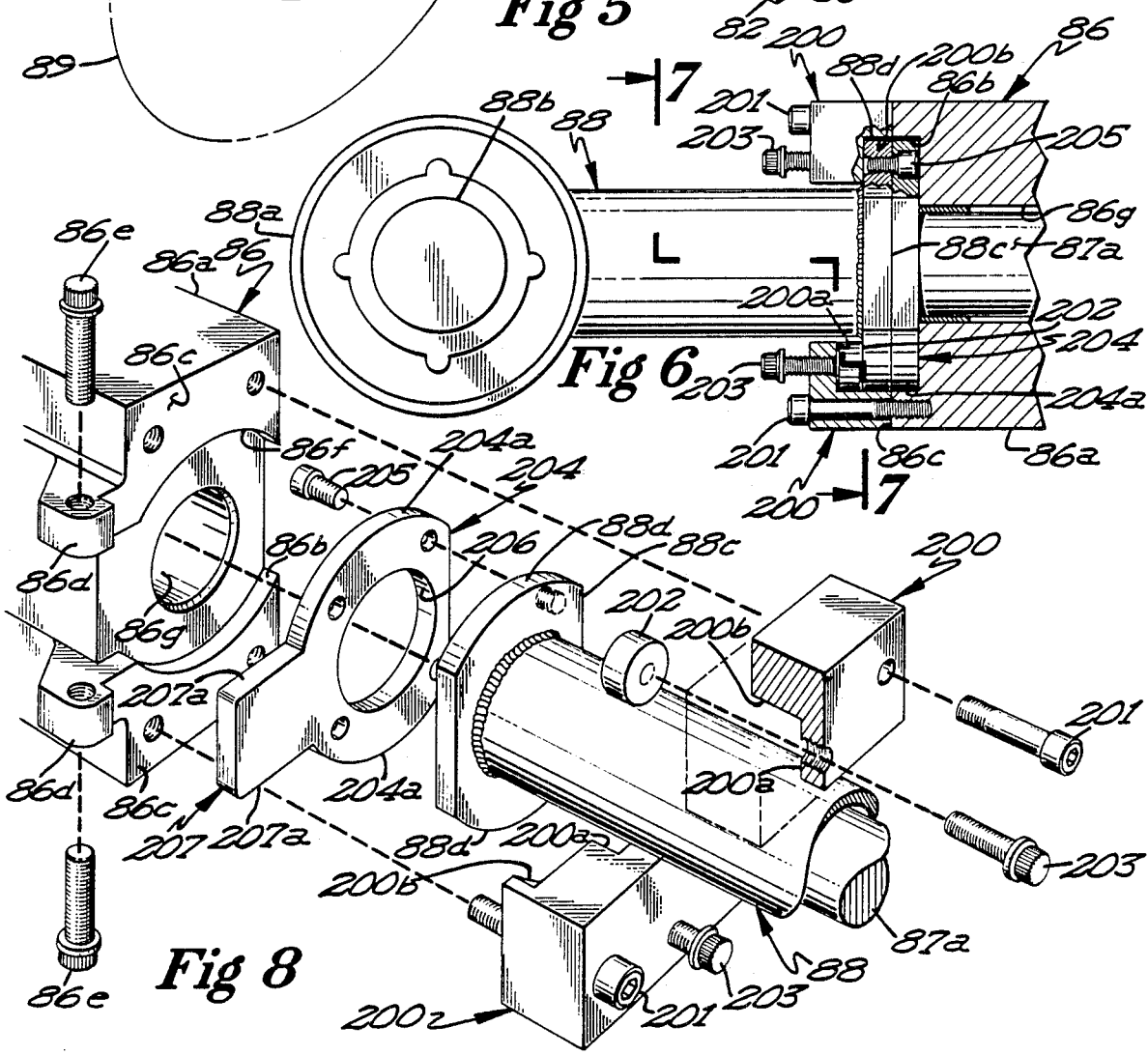

CARCASS SPLITTING APPARATUS

This invention relates to an apparatus for splitting an animal carcass into nearly equal halves along the backbone.

BACKGROUND OF THE INVENTION

In commercial meat packing operations, animals, such as hogs, are slaughtered, bled, skinned, eviscerated, and the carcass is then cut into halves before it is chilled. Typically, the carcasses are suspended from an overhead conveyor and the worker makes a vertical cut through the carcass along the backbone with a power driven saw. The vertical cut is made by the worker as the hog carcass is moved by the overhead conveyor. It will be apparent that this type of carcass splitting procedure is not only dangerous, but it is also a labor-intensive operation.

SUMMARY OF THE INVENTION

It is an object of this invention to provide a novel carcass splitting apparatus which mechanically splits the carcass into two halves as the carcass is being moved by an overhead conveyor.

Another object of this invention is to provide a novel carcass splitting apparatus which includes means for holding the carcass during synchronized movement thereof in a position to effectuate optimum splitting of the carcass along the backbone.

A further object of this invention is to provide a novel carcass splitting apparatus which mechanically splits the carcass into two substantially equal halves in a safe and laborsaving manner.

These and other objects of the invention are more fully described in the following Specification.

FIGURES OF THE DRAWING

FIG. 5 is a fragmentary perspective view of the tool carriage, with certain parts thereof removed, illustrating details of construction thereof;

FIG. 6 is a side view of that portion of the tool carriage illustrated in FIG. 5, with certain portions thereof broken away for clarity;

FIG. 7 is a sectional view taken approximately along the line 7—7 of FIG. 6 and looking in the direction of the arrows; and FIG. 8 is an exploded view of a portion of the tool carriage illustrating the relationship of the various components.

DESCRIPTION OF THE PREFERRED EMBODIMENT

Figure 1:
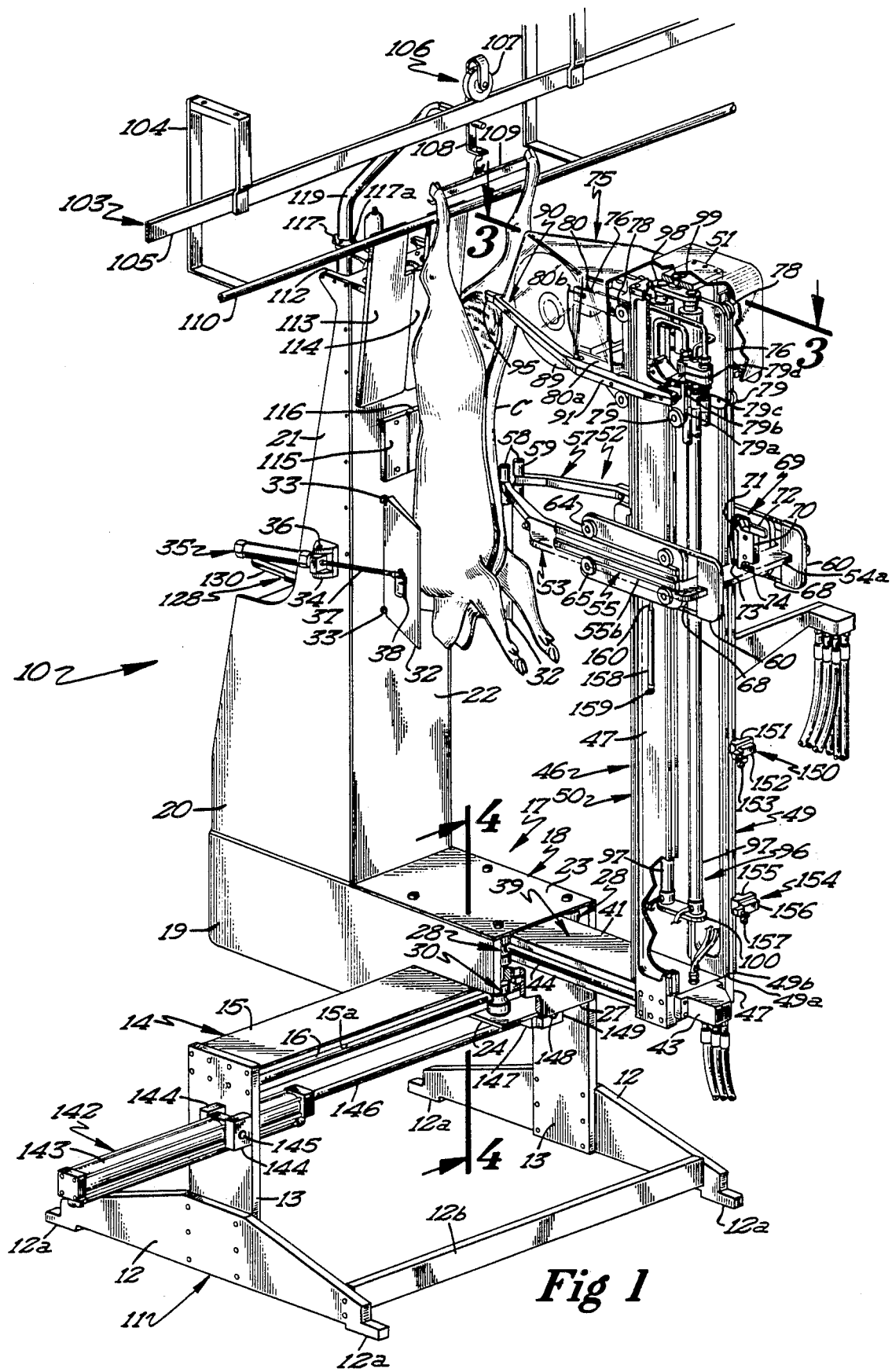
FIG. 1 is a front perspective view of the novel carcass splitting apparatus.

The carcass splitting apparatus 10 includes a base 11 which is preferably secured to a support surface, such as the floor of a meat packing plant. The base includes a pair of elongate transverse members 12 having feet 12a integral therewith which may be bolted to the floor by suitable bolts or the like. Each transverse member is provided with a substantially flat, generally rectangular shaped vertical plate 13 which is secured thereto and projects upwardly therefrom. The base members 12 are also rigidly interconnected by an elongate longitudinally extending manifold member 12b.

An elongate longitudinally extending track structure 14 extends between and is rigidly interconnected to the upper end portions of the vertical plates 13. The track structure 14 includes a substantially flat, generally rectangular shaped horizontally disposed plate 15 having opposite ends thereof rigidly secured to the vertical plates 13. Each longitudinal side edge of the plate 15 has an elongate arcuate recess 15a throughout the length thereof. Each arcuate recess accommodates one of a pair of elongate cylindrical guide rods 16 which are rigidly affixed to the guide plate 15. It will be seen that the outer surface of each of the rods 16 projects outwardly from the associated longitudinal edges of the horizontal plate 15. These rods actually define the guide surfaces for controlling movement of a tracking carriage 17 relative to the base 11.

The tracking carriage 17 includes a tracking carriage frame 18 which is comprised of a pair of substantially identical side frame members or plates 19. Each side frame member 19 is secured to one of a pair of vertical plates 20 integrally formed therewith and projecting upwardly therefrom. Each vertical plate includes a reduced upper portion 21. The vertical plates are rigidly secured together by a vertical back plate 22 which is of rectangular substantially flat configuration.

It will be seen that the side frame members 19 are rigidly secured together by an internal cross member 26 which also mounts the carriage rollers. It will be noted that the upper plate 23 and the lower plate 24 are vertically spaced apart and disposed in substantially parallel relation with respect to each other. It will also be noted that the side frame members 19 have their respective lower edges shaped to extend above the track structure 14.

The tracking carriage frame 18 is also provided with a horizontally disposed intermediate plate 26 which is rigidly affixed to the side frame members 19 and is positioned between the upper plate 23 and the lower plate 24. One end of the intermediate plate 26 is rigidly connected to a front plate 27 and the other end of the intermediate plate is rigidly connected to a rear vertical plate 27a. It will be noted that the rear vertical plate 27a and the front vertical plate 27 are rigidly secured to the lower plate 24 and extend between the latter and the intermediate plate 26.

Two pairs of upper guide roller assemblies 28 are journaled between the upper plate 23 and the intermediate plate 26 by axles 28a. Two pairs of lower guide roller assemblies 30 are positioned between the lower plate 24 and the intermediate plate 26 and are journaled thereon by axle 30a. The roller assemblies are all identical in construction and it will be noted that the upper guide rollers have an annular recess 29 in the mid-portion thereof which is of generally U-shaped configuration. Similarly, the lower guide roller assemblies have an annular recess 31 therein which is also of generally U-shaped configuration. The lower guide roller assemblies are positioned in engaging relation with the guide rods 16 to permit longitudinal movement of the tracking carriage relative to the base 11.

Figure 2:
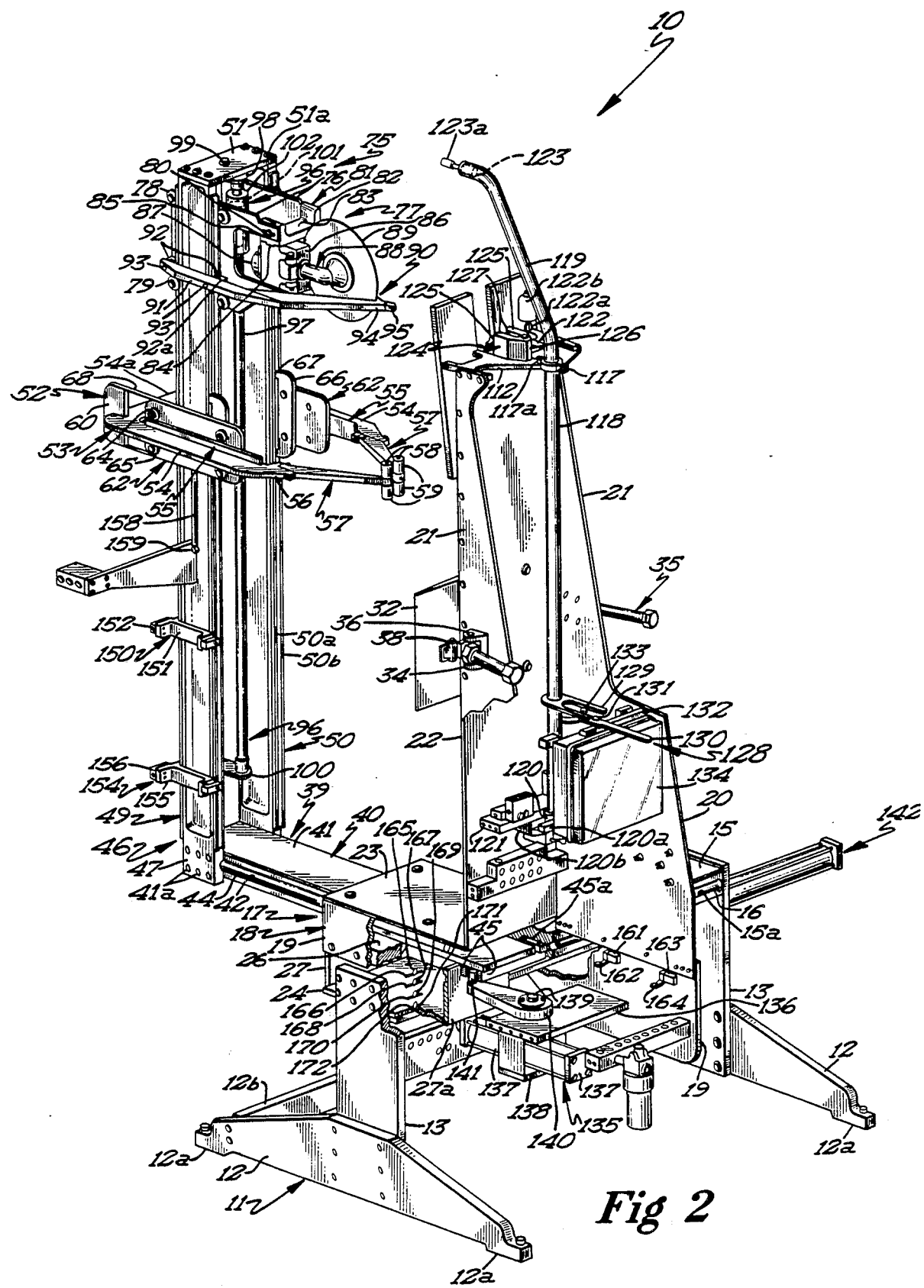
FIG. 2 is a rear perspective view thereof.
Figure 3:
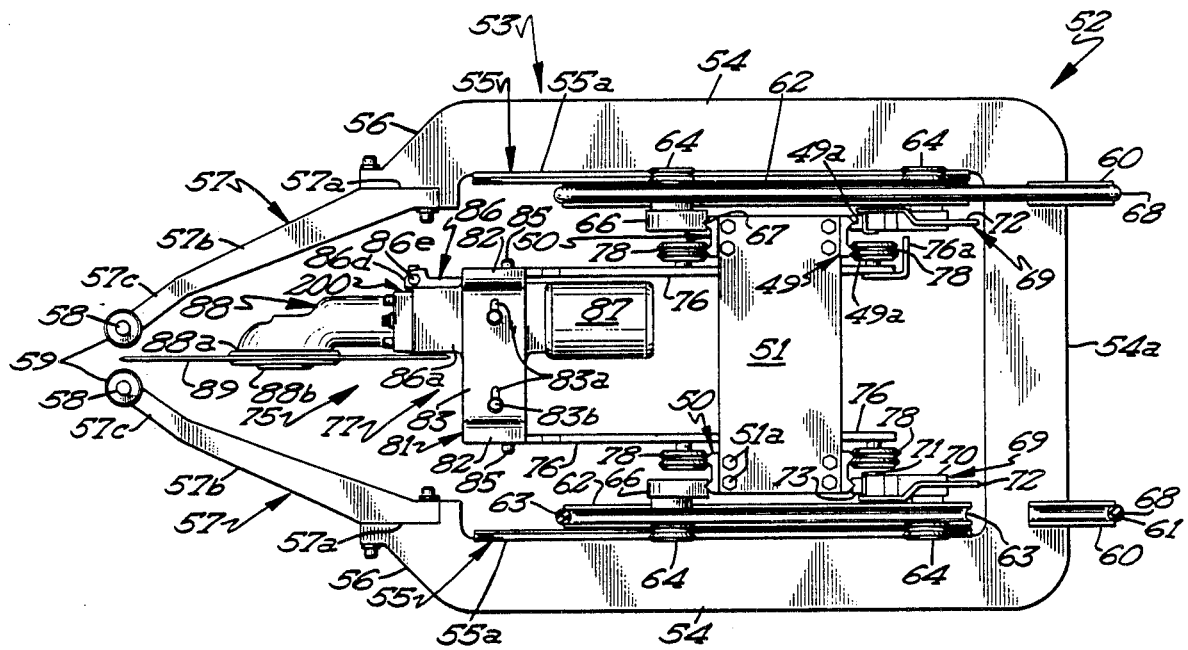
FIG. 3 is a top plan view thereof taken approximately along the cutting plane 3—3 of FIG. 1 and looking in the direction of the arrows.
Figure 4:
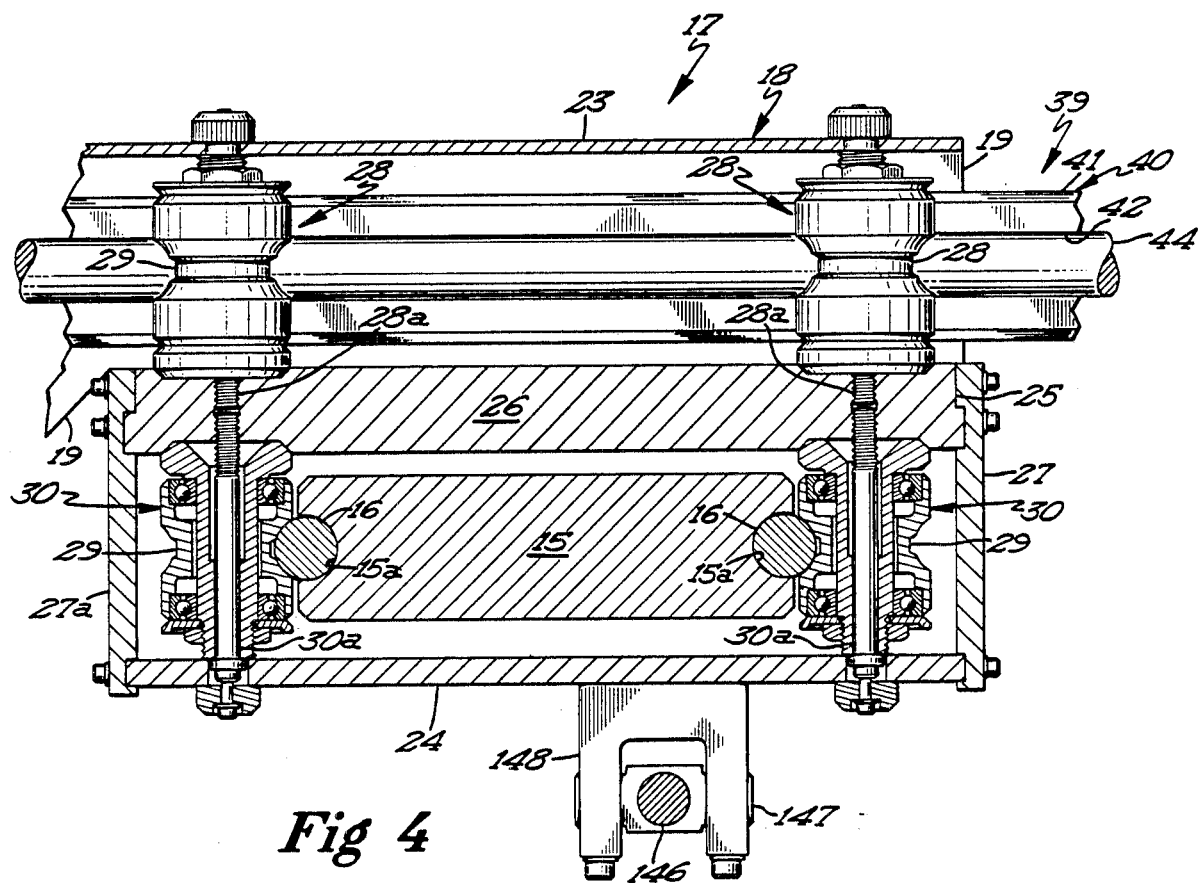
FIG. 4 is a cross-sectional view taken approximately along the line 4—4 of FIG. 1 and looking in the direction of the arrows.

Referring now to FIGS. 1 and 2, it will be seen that a pair of vertically disposed wing plates 32, which are of generally rectangular shaped configuration, are attached to the back plate 22 for shifting movement relative thereto. Each wing plate 32 is pivotally connected to the back plate by pivots 33 to permit lateral swinging movement of each wing plate about a vertical axis. Means are provided for shifting the wing plates towards and away from each other.

In this regard, it will be noted that the reduced upper portion of the vertical plates 20 are each provided with a bracket 34 which projects outwardly therefrom. Each bracket 34 has a double acting pneumatic cylinder 35 pivotally connected thereto by a pivot 36. Piston rod 37 of each pneumatic cylinder is pivotally connected to a bracket 38 secured to one of the wing plates 32. It will be seen that, when the piston rods 37 are extended, the wing plates 32 will be moved towards each other. Conversely, when the piston rods 37 are retracted, the wing plates 32 will be moved away from each other. When the wing plates are moved towards each other, they will engage, center and hold the hog carcass during the splitting operation.

The carcass splitting apparatus 10 also includes a lateral feed carriage 39 which is operable for movement towards and away from the tracking carriage 17. The lateral feed carriage 39 includes a horizontal guide structure 40 which is comprised of an elongate generally rectangular, substantially flat, horizontally disposed guide plate 41 having arcuate recesses 42 in the longitudinal edges thereof. A manifold member 43 is secured to the front end of the guide plate 41 by suitable bolts or the like.

A pair of elongate laterally spaced apart guide rods are each positioned in one of the recesses 42 and are rigidly secured thereto. In this regard, it will be noted that the outer longitudinal peripheries of the guide rods 44 project outwardly from the associated edges of the plate 41. The guide rods 44 engage the upper pairs of guide roller assemblies 28 on the tracking carriage 17. It will be noted that a pair of elongate bars 45 are rigidly affixed to the lower surface of the horizontal guide plate 41 adjacent the rear end thereof. These bars 45 are spaced apart from each other and their function will be described more fully hereinbelow.

The lateral feed carriage 39 also includes a vertical guide structure 46 which is comprised of a pair of substantially identical laterally spaced apart beams 47. It will be noted that each vertical beam 47 is rigidly affixed to one longitudinal edge of the plate 41 by bolts 41a. Each vertical beam 47 has an elongate vertically disposed front guide strip 49 secured to the front surface thereof and has a vertically disposed elongate rear guide strip 50 secured to the rear surface thereof. The guide strips 49 and 50 are of identical construction and it will be noted that the front guide strip has a V-shaped vertically disposed inner guide element 49a and a V-shaped vertically disposed outer guide element 49b integrally formed therewith and projecting outwardly therefrom. Similarly, the rear guide strip 50 has a vertically disposed V-shaped inner guide element 50a and a V-shaped outer guide element 50b integrally formed therewith and projecting outwardly therefrom. The upper end portions of the vertical beams 47 are rigidly interconnected by a top plate 51 by bolts 51a.

A holding arm carriage 52 is mounted on the vertical guide structure 46 of the lateral feed carriage for limited vertical movement relative thereto. The holding arm carriage 52 is comprised of a generally U-shaped one-piece frame 53, including a pair of side frame members 54 which are integral with an end frame member 54a.

The inner surface of the side frame members 54 each has an elongate horizontally disposed guide track 55 rigidly secured thereto. It will be noted that the guide tracks 55 project upwardly and downwardly beyond the upper and lower surfaces of the associated side frame member 54. Each guide track 55 has a V-shaped upper edge surface 55a and a V-shaped lower edge surface 55b.

The side frame members 54 of the U-shaped frame 53 each terminate in an inwardly extending portion 56 to which are rigidly secured a pair of arms 57. It will be noted that the arms 57 converge towards each other, and each includes a rear portion 57a, an angled central portion 57b, and an angled front portion 57c. The front portion 57c of each arm 57 has an aperture therein which accommodates a pin 58, which journals a pair of carcass engaging rollers thereon. These rollers are adapted to engage the carcass to hold the latter against the back plate during the splitting operation.

It will be noted that the end frame member 54a of the U-shaped frame 53 has a pair of vertically disposed band engaging elements 60 rigidly affixed thereto. These band engaging elements are laterally spaced apart and each has a central slot therein which receives the transverse edge portion of the end frame member 54a. It will be noted that the band engaging elements 60 project vertically in opposite directions from the end frame member 54a and each has a continuous peripheral recess 61 and three side edges thereof.

The holding arm carriage also includes a pair of laterally spaced apart substantially parallel vertical side plates 62, each having a continuous peripheral recess 63 throughout the entire periphery thereof. Each plate 62 is positioned interiorly of one of the side frame members 54 of the U-shaped frame 53. Each vertical plate 62 has a pair of spaced apart upper rollers 64 journaled thereon adjacent the upper edge portion thereof. Each vertical plate 62 also has a pair of spaced apart lower rollers 65 journaled thereon adjacent the lower edge portion thereof. It will be noted that the upper pair of rollers 64 engage the track edge 55a of the adjacent track 55 and the lower pair of rollers 65 engage the lower track edge 55b of the associated track. With this arrangement, the U-shaped frame of the holding arm carriage may be shifted relative to the side plates 62.

Each plate 62 also has a vertically disposed track engaging member 66 secured to the inner surface thereof and projecting therefrom. Each track engaging member has a pair of track engaging elements 67 projecting therefrom, each having a V-shaped recess therein. The V-shaped recesses in the track engaging elements 67 mate and engage with the outer guide elements 50b of the rear guide strips 50.

Means are provided for yieldably resisting relative movement of the U-shaped frame 53 relative to the side plates 62. This means includes a pair of endless elastic bands 68, each being trained about the peripheral recess 61 in one of the band engaging elements 60 and in the peripheral recess 63 in one of the side plates 62. With this arrangement, it will be seen that, when the holding arm carriage engages the carcass, yieldable rearward movement of the U-shaped frame 53 relative to the side plates 62 can occur, but against the bias of the elastic bands 68.

The holding arm carriage 52 may be manually vertically adjusted, but its vertical position usually does not vary after a position has been selected. Means are provided for releasably locking the holding arm carriage 52 in an adjusted position on the guide structure 46. This means includes a pair of substantially identical releasable locking units 69, each of which is mounted on one of the side plates 62. Each locking unit 69 includes a body 70 which is secured to the associated side plate 62 by suitable bolts or the like. A generally cylindrical locking pin is rotatably mounted in a recess in the associated locking body 70, and an actuating handle 72 is secured to the locking pin 71 to facilitate rotation of the locking pin. Locking pin 71 for each locking unit is provided with a recess or relieved portion (not shown).

An elongate vertically disposed, triangular shaped locking element 73 is secured to the lower end portion of the associated locking body by a bolt 74. The locking element 73 has an elongate slot (not shown) therein which engages the associated track edge 49b in mating relation. It is pointed out that, when the locking pin 71 for each locking unit is rotated so that the handle is in a horizontal position, as shown in FIG. 1, the locking pin will engage and clamp the locking element 73 against the guide element 49b. However, when the handle 72 is pivoted to the vertical position to rotate the locking pin so that the recess therein confronts the locking element 73, the locking unit will be in a released position and thereby allow the holding arm carriage to be vertically shifted.

A tool carriage 75 is mounted on the vertical guide structure 46 of the lateral feed carriage 39 for vertical movement relative thereto. The tool carriage 75 includes a pair of laterally spaced apart generally rectangular shaped, vertically disposed side plates 76 which are rigidly secured together by a transversely extending horizontal motor assembly 77. Each side plate 76 has a pair of spaced apart upper rollers 78 journaled thereon and each side plate also has a pair of lower rollers 79 mounted thereon. It will be seen that these rollers engage the inner guide elements 49a and 50a of the front and rear guide strips on the vertical beams 47. Again, it will be noted that the rollers have a generally V-shaped centrally located annular recess therein for mating engagement with the V-shaped guide elements.

It will also be noted that each lower roller 79 is journaled on a roller mounting member 79a which is pivotally connected to the associated side plate 76. Each roller mounting member 79a has an elongate adjustment element 79b integrally formed therewith and projecting upwardly therefrom. Each adjustment element has a threaded opening therethrough which accommodates a set screw 79c which engages a stop element 79d on the associated side plate 76.

It will be seen that, when the set screw 79c is adjusted, the roller mounting member will be pivoted relative to the associated side plate 76 and thereby loosen or tighten the lower roller relative to the associated guide elements 49a or 50a. This arrangement allows take-up of the lower rollers with respect to their engagement with the guide elements 49a and 50a, respectively. It will also be noted that the inner surface of one of the side plates 76 is provided with a vertically disposed switch actuator element 76a, the function of which will be described more fully hereinbelow.

Referring again to FIGS. 1 and 2, it will be seen that each side plate 76 has an upper arm 80 and a lower arm 80a projecting outwardly therefrom. Each arm has an elongate slot 80b therein and one of a pair of clamping brackets 81 is secured to the upper pair of arms and the other clamping bracket is secured to the lower pair of arms 80a. Each clamping bracket 81 includes a central portion 83 having a pair of arms 82 integrally formed with the ends thereof and projecting upwardly therefrom. It will be seen that the arms 82 on each clamping bracket have recesses in their outer surfaces for receiving the associated arms of the side plates 76 therein. Suitable bolts 85 extend through the slots 80b in the arms 80 and 80a of the side plates and through a threaded opening in the arms of the clamping brackets to secure the clamping brackets to the side plates.

It will further be noted that the central portion 83 of each clamping bracket has a transversely extending tongue 84 projecting therefrom which engages in a mating groove in the motor mounting bracket 86. In this regard, it is pointed out that the motor mounting bracket 86 is positioned between and is secured to the clamping brackets 81. The motor mounting bracket 86 has a rotary hydraulic motor 87 attached thereto and the output shaft of the motor projects into a shaft housing 88 upon which is journaled a rotary saw blade 89. The shaft housing has the drive means therein, which is connected to the output shaft 88b and the rotary saw blade 89. The shaft housing is enlarged at its outer end to define a gear housing 88a, which contains the drive means. With this arrangement, it will be seen that, when the motor 87 is energized, the rotary saw blade 89 will be rotated.

It is pointed out that the rotary saw blade 89 will require sharpening from time to time through usage. Continuous sharpening of the blade reduces the diameter thereof so the blade must be shifted outwardly or towards the back plate 21. It will be appreciated that this may be accomplished by loosening the bolts 85 which interconnect the brackets 82 to the side plates 76 of the tool carriage. When this is done, the saw blade assembly may be moved in or out, as desired.

It is also pointed out that each of the brackets 81 is provided with an elongated slot 83a in the central portion 83 therein for accommodating a bolt 83b. It will be seen that, by loosening the bolts 83b for the upper and lower brackets 81, the motor mounting bracket 86 may be adjusted laterally relative to the side plates 76. It will, therefore, be seen that the saw blade assembly is mounted for both longitudinal adjustment towards and away from the back plate, as well as lateral adjustment relative to the plates 76.

Means are also provided for permitting the saw blade assembly to be adjusted angularly in either direction relative to the back plate 21. In this regard, the shaft housing 88 has a plate or flange 88c affixed thereto and extending outwardly therefrom. The upper and lower surfaces 88d of the plate 88c are of arcuate configuration, as best seen in FIGS. 5 and 7. It will also be noted that the motor mounting bracket 86 has a front portion 86a whose front surface 86c has a recess 86b formed therein. The recess 86b has upper and lower arcuate surfaces which matingly engage the arcuate surfaces 88d of the plate 88c.

A pair of similar generally rectangular-shaped clamping blocks 20 are secured to the front face 86c of the motor mounting bracket 86 by suitable bolts 201. It will be noted that the clamping blocks 200 are positioned above and below the shaft housing 88, as best seen in FIG. 5. Each clamping block 200 has a rearwardly facing cylindrical recess 200a therein for accommodating one of a pair of cylindrical friction pads 202 therein. A suitable bolt 203 threadedly engages a threaded recess in each clamping block and engages the associated friction pad 202 for the clamping pressure with respect to the plate 88c for the shaft housing 88.

An actuating member 204 having a cylindrical opening 206 therein is positioned around the drive shaft 87a, which is drivably connected to the output shaft 88b. It will be noted that the shaft 88b also extends through an opening 86g in the motor mounting bracket. The upper and lower surfaces 204a of the actuating member 204 are of arcuate configuration and also matingly engage the upper and lower surfaces 86f defining the recesses 86b and the front face 86a of the motor mounting bracket 86. Suitable bolts 205 project through openings in the actuating member 204 and threadedly engage threaded recesses in the plate 88b to interconnect the actuating member 204 to the shaft housing 88.

The actuating member 204 is provided with a laterally projecting tab 207 which projects between a pair of laterally projecting ears 86d integrally formed with the front portion 86a of the motor mounting bracket 86, as best seen in FIG. 7. Each of the ears 86d has a threaded recess therein for accommodating the bolt 86e. The tab 207 for the actuating member 204 is provided with substantially flat parallel upper and lower surfaces 207a and each surface is engaged by one of the adjustment bolts 86e. It will be seen that the angular position of the saw blade 89 may be readily adjusted by loosening the bolts 203 that urge the clamping pads 202 against the plate 88c by then axially extending one of the adjustment bolts 86e while axially retracting the other bolts 86e. The bolts 203 may then be tightened to clamp the shaft housing and rotary blade in an adjusted rotary position. This is done to assure accurate splitting of each carcass during the carcass splitting operation.

Means are also provided for engaging and holding the upper portion (rear end) of the carcass during the carcass splitting operation. This means includes a carcass centering and locating assembly 90, which is mounted on the vertical beams 47 of the lateral feed carriage 39. The carcass centering and locating assembly 90 includes a pair of elongate rear arm members 91, each being clamped against the exterior surface of one of the vertical beams 47 of the lateral feed carriage. In this regard, each rear arm member 91 has a pair of slots in the inner surface thereof which accommodate the finger 92a of one of a pair of similar brackets 92. A bolt 93 extends through one of a pair of openings in each rear arm member 91 and into a threaded recess in one of the brackets 92 to clamp each rear arm member against the exterior surface of the associated vertical beam 47.

Each rear arm member 91 has one of a pair of elongate inwardly angled front arms 94 rigidly secured thereto by welding or the like. The outer end of the front arms 94 has a locking member 95 extending therefrom. It is pointed out that the carcass centering and locating assembly 90 can be vertically adjusted relative to the vertical guide structure 46 by merely loosening the bolts 93 and moving the carcass centering and locating assembly 90 in a vertical direction.

Means are provided for vertically shifting the tool carriage 75 relative to the vertical guide structure 46. In the embodiment shown, this means includes a pair of identical Festo cylinder assemblies 96, each including an elongate Festo cylinder 97. The upper end of each Festo cylinder 97 is rigidly secured to an upper bracket 98, which is secured to the top plate 51 by a bolt 99. The lower ends of the Festo cylinders are secured to a lower bracket 100, which floats relative to the vertical beams 47. Each Festo cylinder 97 has a piston or slug 101 mounted therein which is axially movable relative to the associated cylinder. Each has O-rings on the periphery thereof which engage the interior of the associated cylinder to form an air seal thereat. When air under pressure is introduced into one or the other end of each Festo cylinder, the piston 101 is then moved axially relative to the cylinder in response to this air pressure. The piston is formed of magnetic material, but the Festo cylinder is formed of non-magnetic material, such as stainless steel or the like.

Each Festo cylinder assembly 96 also includes a sleeve 102 which is slidable on the associated cylinder. The sleeve 102 is formed of a magnetic material and will therefore move in response to movement of the associated magnetic piston within the associated cylinder. In the embodiment shown, the sleeves 102 are rigidly secured together and are secured to the side plates by a bracket unit (not shown) so that movement of the sleeves produces corresponding movement of the side plates and the tool carriage 75.

Referring again to FIG. 1, it will be seen that each hog carcass C is moved into position for the splitting operation by overhead conveyor device 103. The overhead conveyor device includes a plurality of hanger brackets 104 which are secured to a permanent structure, such as beams, ceiling or the like, and which support an elongate guide rail 105. Each hog carcass C is suspended from a trolley 106 which includes a trolley wheel 107 that engages and moves along the guide rail 105. A trolley frame 108 is suspended from the trolley wheel 107 and is provided with a hook at its lower end for engaging and supporting an elongate gambrel 109. The gambrel 109 projects through incisions in the hind feet of the hog in a well-known manner. A guide bar 110 is secured to the hanger brackets 104 and the guide bar is engaged by the hind legs of the hog during the splitting operation.

Referring again to FIG. 1, it will be seen that the upper end of the reduced upper vertical portion 21 of the vertical frame members has a bracket 112 extending therebetween and rigidly secured thereto. A pair of similar upper positioning plates 113 of generally rectangular configuration are secured to the bracket 112 and to the back plate 22. The positioning plates 113 are formed of a suitable non-metallic material and are of generally rectangular configuration, but are slightly spaced apart to define a vertically extending space 114 therebetween. These plates are inclined downwardly and towards the back plate 22 and serve to position the rump of the hog in a proper position so that the rotary saw blade 89 can make a cut completely through the carcass, including a cut through the backbone of the carcass.

The back plate 22 is also provided with a lower positioning plate 115 mounted thereon, and this plate is positioned in spaced relation below the lower edges of the upper positioning plates 113. The lower positioning plate 115 is secured to the back plate by suitable bolts and is formed of a suitable plastic material. The lower positioning plate 115 is of rectangular configuration and is provided with a small vertical groove 116 therein along the vertical center line thereof. This lower positioning plate 115 actually controls the depth of cut through the hog carcass for that portion of the carcass located below the upper positioning plates 113. In this regard, the rotary saw will cut through the backbone of the carcass from a point adjacent the lower positioning plate 115, but will not cut through the skin of the carcass. The skin and backbone of the carcass will be cut completely through for that portion of the carcass located above the lower positioning plate 115. Thus, the skin of the carcass will connect the carcass sides at a point adjacent the lower positioning plate 115. The backbone of the carcass, however, will be completely split throughout the length thereof.

A clamping bracket 117 is pivotally connected to the bracket 112 by means of a pivot 117a. The clamping bracket 117 is clamped around a generally vertically disposed elongate torque tube 118 which has an angularly offset upper end portion 119. The lower end of the tube is pivoted to a bracket 121 by means of a pivot 120. The pivot 120 is aligned with the pivot 117a to permit pivoting of the torque tube 118 about a vertical axis.

A Bimba piston and cylinder unit 122 is pivotally connected to the bracket 112, and the piston rod thereof is pivotally connected to the clamping bracket 117. The piston rod side of this cylinder is connected to a supply of air under pressure, while the other end of this cylinder is connected to a volume of hydraulic fluid at atmospheric pressure. Air under pressure is supplied to the servo unit to normally bias the torque tube 118 about its pivotal axis towards the viewer, as viewed in FIG. 2. Thus, the torque tube is biased in an upstream direction.

The hog trolley 108 engages pin 123a, causing torque tube 119 to rotate in a clockwise direction, actuating the servo valve 120b by cam 120a, which is integral with pivot 120. This slaves the motion of the tracking carriage 17 to the motion of trolley 108 and, thus, the carcass during the splitting operation.

When this carcass splitting operation is complete, pin 123a is retracted by cylinder 123, which unslaves carriage 17. The counter-clockwise bias caused by cylinder 122 would occur too rapidly, except that oil, which has flowed into the blind end of cylinder 122, has this flow back out, restricted by an adjustable flow control valve 122a, giving a smooth direction reversal to carriage 17.

As the carriage returns home, the top end of arm 119 will engage a zero position stop block attached to the rail super structure. This will rotate torque tube 119 clockwise until the null position on servo valve 120b is reached, decelerating and then stopping the carriage at the home position.

During the splitting operation, the carcass centering and locating assembly 90 will be moved towards the back plate 22 and means are provided for cooperating with the locking member 95 for centering the rump end portion of the hog carcass C against these plates 113. In this regard, a female guide element 124 is mounted on the bracket 112 and projects upwardly therefrom. The female guide element 124 is formed of a hard plastic material, such as Delrin or the like, and is of generally U-shaped configuration, including a pair of legs 125 which are integral with a back portion 126. It will be noted that the inner surfaces of the legs 125 are beveled, as at 127. With this arrangement, carcass centering and locating assembly 90 is advanced towards the female guide element 124, and the locking member 95 will pass into the recess defined by the space between the legs 125. The bevel surfaces 127 facilitate mating engagement of these parts. The angled configuration of the front arms 94 engage and clamp the ham portions of the hog carcass against the upper positioning plates 113.

Referring again to FIG. 2, it will be seen that the torque tube 118 has a generally U-shaped yoke member 128 clamped thereto adjacent the lower end portion thereof. The U-shaped yoke member has a pair of arms 129 projecting therefrom and disposed in spaced apart relation. An elongate lever 130 is pivotally connected by a pivot 131 to a bracket 132, which is attached to the back plate 22, and the lever has a pin 133 affixed to one end thereof and projecting upwardly therefrom. It will be seen that the pin 133 is positioned between the arms 129 of the yoke member 128. When the lever 130 is pivoted in either direction, the pin 133 will engage one of the arms 129 to thereby swing the torque tube about its pivotal axis. When the torque tube is pivoted, this actuates the cycle and permits the entire apparatus to be shifted to facilitate cleaning, repair and the like of the apparatus.

Referring to FIG. 2, it will be seen that the bracket 132, upon which the lever 130 is pivoted, is actually mounted on a housing 134, which is secured to the vertical frame members 20. The housing 134 contains a plurality of the control components for controlling the operation of the carcass splitting apparatus.

Means are provided for producing lateral reciprocation of the lateral feed carriage 39 towards and away from the back plate 22. This means includes a rotary actuator 135 which is mounted on a bracket plate 136, which extends between the side frame members 19 of the tracking carriage frame 18. The rotary actuator is a commercial model rotary actuator of the rack and pinion type. The rotary actuator includes a pair of double acting hydraulic cylinders 137 arranged in opposed relation and whose piston rods (not shown) define a rack. The rack engages a pinion (not shown) and the rack and pinion elements are enclosed in a housing 138. An output shaft 139 is connected to the pinion and has one end thereof keyed to one end of an elongate arm 140. In the embodiment shown, the actuator arm 140 is mounted above the bracket plate 136. The other end of the actuator arm 140 has a revolvable Torrington CRS cam follower 141 journaled thereon, and this cam follower is positioned between and is engageable with the bars 45 which are secured to the lower surface of the plate 41. The bars 45 constitute the guide plate for the cam follower.

The output shaft 139 reciprocates through an arc of 180 degrees, thereby moving the actuator arm 140 through the same arc. The coaction of the cam follower 141 with the guide structure defined by the bars 85 produces reciprocating movement of the lateral feed carriage towards and away from the back plate 22.

Means are provided for reciprocating the tracking carriage 17 longitudinally of the track structure 14. In the embodiment shown, this means includes a double acting hydraulic cylinder and piston unit 142, which includes a cylinder 143 mounted on brackets 144 by pins 145. The brackets 144 are secured to one of the vertical plates 13. The cylinder 143 is provided with a piston having a piston rod 146 secured thereto and projecting exteriorly of the cylinder. The piston rod 146 has a connector block 147 threaded thereon and this connector block is connected by a pin 148 to a U-shaped connector member 149 secured to the lower plate 24 of the tracking frame carriage 18. It will, therefore, be seen that, when the piston rod 146 is extended and retracted, the tracking carriage 17 will be reciprocated longitudinally of the track structure 14.

Means are provided for controlling the length of downward travel of the tool or saw carriage 75, and this means includes an upper limit switch assembly 150, which is comprised of a bracket 151 mounted on one of the vertical beams 47. The bracket 151 has a limit switch 152 secured thereto and the limit switch is provided with a switch arm 153. The switch arm 153 is disposed in obstructing relation with respect to the switch actuating element 76a mounted on one of the side plates 76. It will, therefore, be seen that, when the saw carriage 75 has traveled downwardly a sufficient distance so that the switch actuating element 76a engages the switch arm 153, further downward travel is interrupted.

However, in some instances, the length of the hog carcasses will be substantially longer than the length of normal carcasses. In this regard, large sows have longer carcasses than the normal carcass, and the vertical length of travel of the saw carriage 75 must be increased when these longer carcasses are being processed.

Therefore, a lower limit switch assembly 154 is mounted on one of the vertical beams 47, but at a location below the upper switch assembly 150. The lower switch assembly 154 includes a bracket 155 having a limit switch 156 mounted thereon. The limit switch is provided with a switch arm 157 which is also disposed in obstructing relation with respect to the switch actuating element 76a. This arrangement permits a longer vertical cut to be made by the rotary saw in a correspondingly longer hog carcass.

It is pointed out that, when the holding arm carriage 52 is vertically adjusted relative to the vertical guide structure 46, means are provided for preventing overadjustment of the carriage in a downward direction. In this regard, each vertical beam 47 is provided with a vertically disposed cylinder 158 which is secured to the associated beam by a pin 159. The cylinder is filled with nitrogen and has a piston movable therein to which is connected a piston rod 160. This piston rod 160 for each cylinder is connected to one of the side plates 62, as best seen in FIG. 1. With this arrangement, when the holding arm carriage 52 is vertically adjusted and then locked in its vertically adjusted position, there will be a tendency of the holding arm carriage to float upwardly in response to the compressed nitrogen gas within the cylinders.

Referring now to FIG. 2, it will be seen that one of the side frame members 19 of the tracking carriage frame 18 is provided with a limit switch 161 having a switch arm 162. The switch arm 164 is positioned so that it will be engaged by the rotary actuator 45a during movement of the latter. The limit switch 163 must be actuated before the saw carriage will begin its descent.

The same side frame member 19 also has a second limit switch 161 mounted thereon which is provided with a switch arm 162. The switch arm 162 is also positioned to be engaged by the rotary actuator 45a during oscillating movement of the latter and this switch arm actuates cylinder unit 123 to withdraw the probe 123a. This occurs as the saw pulls away from the split carcass.

Referring again to FIG. 2, it will be noted that the lower transverse plate 24 of the tracking carriage frame 18 has a plurality of slots therein, each accommodating a switch arm therethrough. A switch arm 165 projects through a slot 166 and a switch arm 167 projects through a slot 168. A switch arm 169 projects through a slot 170 and the switch arm 171 projects through a slot 172 in the lower plate 24. These switch arms actuate limit switches in response to movement of the tracking carriage. It will be noted that the switch arms are staggered relative to each other so that they are sequentially actuated during movement of the tracking carriage. One of the switch arms is actuated shortly after the tracking carriage begins its movement relative to the track structure 14 to thereby condition other control units for operation. This same switch arm is actuated in the other direction when the tracking carriage has returned to its original starting position. The limit switch, which causes withdrawal of the probe 123a and limit switch 161 (i.e., the saw carriage is clear of the carcass), must be actuated before the saw carriage will return to its original position.

During operation of the hog splitting apparatus, the hog carcasses will be moved along the guide rail 105 of the overhead conveyor device 103 by the trolley 106. Each hog carcass is suspended from the trolley frame 108 by the gambrel 109. The sensor probe 123a will be in the extended position and will be engaged by the trolley frame 108, which initiates the entire carcass splitting cycle. When the probe 123a is engaged, the piston rod 146 of the double acting hydraulic cylinder 143 will be retracted to thereby shift the tracking carriage 17 in a downstream direction longitudinally of the track structure 14.

One of the limit switch arms will be actuated by engagement with a cam attached to the bottom of guide plate 15 to thereby cause the rotary actuator 135 to be operated. In this regard, the lateral feed carriage 39 will be in a retracted position relative to the back plate 22 and, when the rotary actuator 135 is operated, the lateral feed carriage 39 will be shifted towards the back plate. The lateral feed carriage 39 will continue in its movement until the actuator arm 140 has swung through an arc of 180 degrees from the position illustrated in FIG. 2. The limit switch 163 will be actuated to indicate that the saw carriage is in the fully advanced or forward position. When this occurs, the carcass centering and locating assembly 90 will have engaged the rump portion of the hog carcass C and will pin the carcass against the upper positioning plates 113. The double acting pneumatic cylinders 35 will be actuated to move the flaps or wing plates 32 towards each other to thereby grip the lower end portion of the hog carcass. The holding arm carriage will have advanced with the lateral feed carriage and will be in engaging relation with the mid-portion of the hog carcass to clamp the same against the lower positioning plate 115.

It is pointed out that, in the embodiment shown, the rotary hydrualic motor 87 will be continuously operated to continuously operate the rotary saw blade 89. When the lateral feed carriage has reached its fully advanced position, the Festo cylinder assemblies 96 will be actuated so that the piston 101 in each cylinder is moved downwardly to thereby move the saw carriage downwardly. The rollers on the saw carriage will roll along the guide elements 49a and 50a during this movement. The rotary saw will cut through the backbone and skin of the hog carcass until the saw approaches the lower positioning plate. The depth of cut will change slightly so that the rotary saw blade will cut through the backbone but will not sever the skin connecting that portion of the carcass.

The saw carriage will continue in its downward movement until the saw carriage reaches a level located just above the wings 82. When it reaches this position, the pneumatic cylinders 35 will be actuated to retract the piston rods 37 and thereby move the wing plates 32 to a retracted position. This is necessary in order to allow the saw blade to cut smoothly through the backbone of the hog carcass at this particular location. The Festo cylinders will continue to move the saw carriage in a downward direction until the switch actuating element 76a engages either the upper limit switch 150 or the lower limit switch 154.

In this regard, only one of the limit switches will be operatively connected to the controlling system of the apparatus, while the other limit switch will be in an inoperative mode. If normal length hog carcasses are being processed, the upper limit switch will be in an operative mode. Conversely, if longer carcasses are being run, then the lower limit switch will be connected in an operative mode. During vertical movement of the saw carriage, the tracking carriage will have continued in its movement longitudinally of the track structure 14.

After the saw carriage has completely cut through the carcass, one of the limit switches on the lower plate 124 will have been operated to indicate this result to the controlling logic of the apparatus. The rotary arm will be operated to shift the lateral feed carriage in a retracted direction and, when this occurs, the limit switch 161 will be operated to cause the probe 123a to be retracted. The limit switch 161 also operates the Festo cylinders 96 in a vertical mode to shift the saw carriage vertically relative to the vertical guide structure 46. The double acting hydraulic cylinder 142 will be actuated to extend the piston rod 46 and to thereby return the tracking carriage in an upstream direction to its original position. When the tracking carriage reaches its original position, a limit switch will be tripped to again extend the probe 123a and to actuate the wash cycle for the rotary saw blade 89. Operation of the rotary actuator 135 will be interrupted so that all the components of the hog splitting apparatus are in their original position conditioned for the next carcass splitting cycle.

From the foregoing, it will be seen that I have provided a novel process and apparatus for splitting hog carcasses which eliminates the danger of injury attendant in the conventional manual method of splitting carcasses. It will further be noted that the process and apparatus is operable to permit continuous and uniform splitting of hog carcasses, which is a result which could not be obtained with the conventional manual method.

Thus, it will be seen that I have provided a novel process and apparatus for splitting hog carcasses in a more efficient manner than any heretofore known comparable system.

What is claimed is:

1. Apparatus for splitting an animal carcass longitudinally through the backbone thereof, such as a hog carcass, as the latter is moved in a predetermined path of travel while suspended by a suspension mechanism from an overhead conveyor, comprising:

guide means extending parallel to the path of movement of the carcass, a tracking carriage having track engaging means thereon engaging said guide means for movement along the latter, a generally vertically disposed positioning structure on said tracking carriage for movement therewith, means operatively interrelated to said tracking carriage for shifting the latter in an advanced direction at a speed corresponding to the speed of movement of the carcass to be split, and for shifting the tracking carriage in a return direction to its original position, a lateral feed carriage movably mounted on said tracking carriage for movement relative thereto in a forward direction to a forward position, and a reverse direction to a retracted position, movement of said lateral feed carriage being substantially normal to the direction of movement of said tracking carriage, carcass engaging means on said lateral feed carriage for movement therewith, said carcass engaging means engaging and pressing the carcass against the positioning structure when the lateral feed carriage is moved to the forward position, means operatively interrelated to said lateral feed carriage for shifting the same between said forward and retracted positions, a saw carriage vertically mounted on said lateral feed carriage for vertical shifting movement relative thereto, said saw carriage having a vertically disposed rotary saw blade thereon, means for rotating said rotary saw blade, and means for vertically shifting the saw carriage relative to the lateral feed carriage whereby, when said lateral feed carriage is in the forward position and said saw carriage is shifted downwardly, the rotary saw will cut longitudinally through the length of the backbone of the carcass.

2. The apparatus as defined in claim 1 wherein said tracking carriage is shifted horizontally by said carriage shifting means.

3. The apparatus as defined in claim 1 wherein said lateral feed carriage is shifted horizontally by said lateral feed carriage shifting means.

4. The apparatus as defined in claim 1 wherein said lateral feed carriage includes a vertical guide structure, said saw carriage being vertically shiftable on said vertical guide structure.

5. The apparatus as defined in claim 1 wherein said lateral feed carriage includes a horizontal guide structure, interacting guide elements on said horizontal guide structure, and said tracking carriage cooperating with each other to permit horizontal movement of the lateral feed carriage relative to the tracking carriage.

6. The apparatus as defined in claim 5 wherein said lateral feed carriage includes a vertical guide structure rigidly affixed to said horizontal guide structure and projecting upwardly therefrom.

7. The apparatus as defined in claim 4 wherein said carcass engaging means includes a carcass centering and locating assembly mounted on said vertical guide structure adjacent the upper end thereof and projecting horizontally therefrom towards said positioning structure, said carcass centering and locating assembly engaging the rump portion of the carcass when the lateral feed carriage is in the forward position to clamp the rump portion of the carcass against said positioning structure.

8. The apparatus as defined in claim 7 wherein said carcass centering and locating assembly may be vertically adjusted relative to said vertical guide structure.

9. The apparatus as defined in claim 4 wherein said carcass engaging means includes a holding arm carriage mounted on said vertical guide structure and projecting laterally therefrom towards said positioning structure and engaging the mid-portion of the carcass to clamp the saw against the positioning structure when said lateral feed carriage is in the forward position.

10. The apparatus as defined in claim 9 and a carcass centering and locating assembly mounted on said vertical guide structure at a location above said holding arm carriage, said carcass centering and locating assembly engaging the rump portion of the carcass to thereby clamp the carcass against said positioning structure.

11. The apparatus as defined in claim 1 and clamping means on said positioning structure shiftable between clamping and release positions, said clamping means engaging and clamping the mid-portion of the carcass when in the clamping position, and means for shifting the clamping means between said clamping and release positions.

12. The apparatus as defined in claim 3 wherein said means for shifting said lateral feed carriage between said forward and retracted positions comprises a rotary actuator, an actuator arm connected to said rotary actuator engaging said lateral feed carriage and being oscillatable in opposite directions about a vertical axis through an arc of approximately 180 degrees.

13. The apparatus as defined in claim 1 wherein said guide means includes an elongate track structure having a pair of elongate horizontally extending guide tracks extending parallel to said direction of travel of the carcass, said tracking carriage having a plurality of track engaging rollers thereon engaging said guide track.

14. The apparatus as defined in claim 5 wherein said horizontal guide structure of said lateral feed carriage is provided with a pair of spaced apart, elongate, horizontally extending guide tracks disposed substantially normal to said means, a plurality of rollers on said tracking carriage engaging said guide tracks on said horizontal guide structure for guiding the latter between forward and retracted positions.

15. The apparatus as defined in claim 9 wherein said holding arm carriage is vertically adjustable relative to said vertical guide structure, locking means on said holding arm carriage engaging said vertical guide structure for locking the holding arm carriage in an adjusted position.

16. An apparatus for splitting an animal carcass longitudinally through the backbone thereof, such as a hog carcass, as the latter is moved in a predetermined path of travel while suspended by a suspension mechanism from an overhead conveyor, comprising:

a tracking carriage mounted for shifting movement in a direction corresponding to the direction of movement of the carcass to be split, means operatively connected to said tracking carriage for shifting the latter in an advanced direction at a speed corresponding to the speed of movement of the carcass, and shifting the tracking carriage in a return direction to its original position, a lateral feed carriage movably mounted on said tracking carriage for movement relative thereto in a forward direction to a forward position, and a reverse direction to a retracted position, movement of said lateral feed carriage being substantially normal to the direction of movement of said tracking carriage, means operatively connected to said lateral feed carriage for shifting the same between said forward and said retracted positions, cooperating positioning means on said lateral feed carriage and on said tracking carriage engaging the carcass to position the same for splitting, a saw carriage vertically mounted on said lateral feed carriage for vertical shifting movement relative thereto, said saw carriage having a vertically disposed driven saw blade thereon, and means for vertically shifting the saw carriage relative to the lateral feed carriage whereby, when said lateral feed carriage is in the forward position and said saw carriage is shifted downwardly, the rotary saw will cut longitudinally through the length of the backbone of the carcass.

* * * * *